3,188,265
PACKAGING FILMS
Robert R. Charbonneau, Mahtomedi, and Joseph F. Abere, White Bear Lake, Minn., assignors to Minnesota Mining and Manufacturing Company, St. Paul, Minn., a corporation of Delaware
No Drawing. Filed Nov. 12, 1957, Ser. No. 695,532
11 Claims. (Cl. 161—188)

This application is a continuation-in-part of our co-pending application Serial No. 547,325, filed November 16, 1955. This invention relates to novel films, which have important uses in the packaging field. While not limited thereto, our novel films have important application in the field of heat-sealed packages.

Heretofore heat-sealable moistureproof cellophane has been widely used and has been commonly heat-sealed in conventional heat-sealing packaging machinery, the heat-sealing occurring at moderately elevated temperatures in the range of 275° F. to 400° F. Heat-sealing moistureproof cellophane came into wide usage commercially around 1930 or soon thereafter. The conventional heat-sealing moistureproof cellophane consists of a regenerated cellulose film coated with a nitrocellulose layer. It provides much greater moistureproofness than does ordinary uncoated cellophane, which had earlier been used, and has been widely used for the last 20 years or more for the packaging of bakery goods, meats, dried peas and various other grocery items, hardware items, etc. However, ordinary moistureproof cellophane is only relatively moistureproof and it is usually not recommended as a transparent packaging material for powdery materials such as dried milk, soft drink powders, hygroscopic drug or chemical powders, etc. Indeed ordinary hard candies packaged in moistureproof cellophane, when allowed to stand for a period of time under hot, humid atmospheric conditions, become stuck together in a manner undesirable from the merchandising viewpoint. In spite of its shortcomings, however, ordinary heat-sealable moistureproof cellophane heretofore has been, by far, the most widely used heat-sealing packaging material, making up on the order of 70% of the recent transparent packaging film market.

In an effort to provide a more moistureproof material, suitable in packaging many things for which ordinary heat-sealing moistureproof cellophane is not satisfactory, a polyethylene coated cellophane film has been put on the market relatively recently and has had a considerable usage, although the volume of its usage has been very small compared with that of ordinary moistureproof cellophane. It has the advantage that it lends itself to use in conventional heat-sealing equipment, available all over the country. It also has the advantage that it has added moistureproofness so as to make it suitable for packaging things like powdered sugar, dried soft drink mix, etc., for which conventional moistureproof cellophane is not sufficiently moistureproof to be useful. However it has the disadvantage that it is subject to delamination, in that the outer layer of cellophane is sensitive to water and humidity conditions, becoming flimsy if the package becomes wet on the outside, and becoming relatively brittle under very dry conditions, such as are encountered in many homes and buildings in the northern part of the country in the winter time.

Also in recent years plain polyethylene film has been used in making transparent packages. It does not lend itself to heat-sealing on ordinary conventional jaw type heat-sealing packaging machinery, such as has been well known in the case of sealing moistureproof cellophane; but special techniques have been developed by which packages have been made from straight polyethylene. Nonetheless, these techniques require closer supervision and are not nearly so widely usable as the conventional type of equipment used to heat-seal moistureproof cellophane. Additionally, polyethylene has the shortcoming that in film form, i.e., no greater than about 10 mils thick, it is quite readily permeated by oxygen (undesirable in foodstuffs), and by solvent vapors, many aromatic materials (odors, bouquets, etc.), vegetable oils, etc., all of which limit the acceptability of polyethylene film as such for wide use in the packaging field.

Other films, making up less than 20% of the packaging industry, include rubber hydrochloride films such as the so-called "Pliofilm," of Goodyear Tire and Rubber Company, vinylidene chloride based films such as "Saran," made by Dow Chemical Company, vinyl chloride-vinyl acetate copolymer, cellulose acetate, and polyester films such as "Mylar," a polyethylene terephthalate polyester film made by E. I. du Pont de Nemours & Co. None of these materials lend themselves to ready use on the most widely available types of heat-sealing packaging machinery. The rubber hydrochloride films have a relatively low maximum use temperature, e.g., about 200° F., and these films present a distortion problem. Vinylidene chloride films, in the thin gauges used in packaging, are very difficult to handle on packaging machinery, and have a very narrow range in which a heat-seal can be effected. Additionally, they present a problem with static electricity. Also, when a vinylidene chloride film is heat-sealed, this causes shrinkage and puckering, which spoils the attractiveness of the package which it is desired to preserve.

Vinyl chloride-vinyl acetate copolymer films, used to a very limited extent in the packaging field, cannot be heat-sealed on conventional packaging machinery, and only with difficulty, for example, by the use of electronic methods, where the films are fused or welded together. Additionally these films have a relatively low maximum use temperature and, unless highly plasticized, are not useful at low temperatures; and if highly plasticized they present plasticizer problems in respect to migration, staining, toxicity, etc. Cellulose acetate films offer no protection against moisture vapor and cannot be heat-sealed by conventional cellophane heat-sealing methods. Polyester films, such as "Mylar" and similar films of other organic polymers having polyester linkages in the polymer chain, while providing great strength and many advantages, never had any substantial use in the packaging field prior to our invention. The polyester films could be heat-sealed only at quite high temperatures. Such films melt at around 490° F., and the polymer degrades at a temperature very close to that required for heat-sealing. The polyester films are not heat-sealable on any conventional heat-sealing packaging machinery, and none had been developed prior to this invention to make polyester films usable to any substantial extent for packaging.

Some attempts were apparently made heretofore to laminate another film to a polyester film, so as to make a polyester film useful in packaging. Some efforts were made to laminate a film of polyethylene to a polyester film, but all such efforts resulted in a film which would not remain bonded at the interface between the polyester and the polyethylene under conditions of usage, being subject to delamination under such ordinary conditions as high humidity in the ambient atmosphere. Such weakly bonded or overlaid films of polyester and polyethylene had no acceptance in the heat-sealing packaging field, and amounted to no more than abortive experimental exploration.

Thus prior to our invention moistureproof cellophane made up the great majority of the heat-sealing packaging material used, with the other materials mentioned above being used in lesser quantities and for limited purposes.

It was a purpose of our invention to devise a film material which, although not limited thereto, would have wide use in the packaging field, and we were especially concerned to provide a film which could readily be heat-sealed.

It is an object of our invention to provide a packaging film which is much more resistant to moisture and prolonged contact with water than is moistureproof cellophane, and also which is more stable and flexible with wide changes in temperature and atmospheric conditions. A further object is to provide a packaging material which can successfully package watery or oily materials, and which has good resistance to penetration by moisture, oxygen, aromatics, solvent fumes, etc. These and other objects and advantages will become apparent from the description as a whole.

An important embodiment of our invention consists of a thin, strong, tough, heat-resistant oriented polyester film coated with a thin heat-sealable layer of polyethylene to provide a total film thickness of from about 1 to about 10 mils, and preferably from about 1 to 5 mils, with the polyester and polyethylene layers of the film being so bonded together at the interface that the film cannot manually be pulled apart under normal conditions of temperature and humidity, and any attempt to mechanically separate the layers results in rupture of the heat-sealable polyethylene portion of the film.

If our film, as for example the embodiment made with a polyester coated with polyethylene and strongly bonded at the interface, is used to make a package in which a vegetable oil or the like is enclosed, while the vegetable oil may and undoubtedly does penetrate the surface of the inside layers, which is the polyethylene layer, to some extent, yet it does not loosen and rupture the bond at the interface between the polyester film and the polyethylene coating. Further, if such a package is subjected to an ambient atmosphere of about 100% relative humidity and a temperature of 120° F., although the moisture undoubtedly penetrates the outer polyester film, even after many hours of such exposure there is no loosening and rupture of the bond between the polyester film and the polyethylene coating of our structure. On the other hand, if a film made by laminating a polyethylene to a polyester, according to the approach used by others, is formed into a package to enclose the same oil or subjected to such temperature and humidity conditions, the two films will start to separate at their interface within a few hours, resulting in a package which is commercially unsatisfactory. As soon as separation at the interface begins, with oil or moisture between the polyethylene film and the polyester film, the appearance of the package is already marred and this separation will continue to the edge of the package, resulting in leakage and a messy condition, making the material worthless as a substitute for other packaging media.

Methods for making the preferred polyethylene-polyester packaging films of this invention are described in the following specific examples, given herein to enable a more comprehensive understanding of the invention.

EXAMPLE 1

A laminate obtained by extruding polyethylene onto oriented polyethylene terephthalate film was irradiated through the polyethylene layer for 30 seconds with a Hanovia UA-15 lamp. The irradiated laminate had a good appearance and was strong, much stronger than the laminate before irradiation.

Another laminate was prepared using tensilized polyethylene terephthalate polyester film which had been coated with a thin primer layer of polychloroprene and irradiated through the primer for 8 seconds with a General Electric B-H6 lamp at a lamp-to-film distance of 2¾ inches. Polyethylene was extruded onto the primed side of the polyester film, but the bond between the polyethylene and the polychloroprene was undesirably weak. After irradiation through the polyethylene layer with the UA-15 lamp for 30 seconds, a strong, commercially useful laminate was obtained.

Another procedure has been found to provide excellent laminates of polyester and polyethylene films. Oriented polyethylene terephthalate polyester film 2 mils in thickness and polyethylene film 4 mils in thickness were laid together on a hot plate preheated to about 120° C. By passing a roller under moderate hand pressure over the films several times for a period of about 5 seconds, the polyethylene flowed sufficiently to form an interface with the polyester film. This interface was irradiated for 30 seconds through the polyethylene layer with the Hanovia UA-15 lamp.

Sample of each of the polyethylene-polyester laminates prepared as described in this example were tested by heat-sealing each to an identical sample with the polyethylene layers fused together under pressure. In each case, attempts to effect mechanical delamination of these panels failed due to tearing of the films. In contrast, heat-sealed panels prepared by joining polyethylene-polyester laminates which were identically prepared except for the omission of the irradiation step can always be peeled apart mechanically, delamination occurring between the fused polyethylene layer and one of the polyester layers. Where the procedure of joining the preformed polyethylene film to polyester film on a hot plate is followed without subsequent irradiation of the interface, heat-sealed panels prepared therefrom sometimes fall apart before they can be tested.

Delamination at the polyethylene-polyester bond of the panels prepared by heat-sealing the irradiated polyethylene-polyester laminates can be effected through the use of solvents which dissolve the polyethylene. However, even following this procedure an ultra-thin residue of polyethylene can generally be detected on the polyester film. This phenomenon indicates that the strong adhesion between the polyethylene and polyester films is not a mere mechanical interlocking aided by secondary valence forces, but is the result of primary chemical bonds. Because the chemical interfacial bonding is not accompanied by any perceptible change in the properties of the films, it follows that the gross chemical effect is at the interface of the films.

The Hanovia UA-15 lamp is a low pressure germicidal lamp marketed by Hanovia Chemical and Manufacturing Company. This is a 3000 watt lamp having a 48 inch arc and having a continuous emission spectrum around 2537 A.

The General Electric B-H6 lamp is an air-cooled, high pressure mercury vapor lamp requiring about 900 to 1000 watts. It has a one inch arc, a brightness of about 65,000 lumens and operates at a pressure of about 200 atmospheres. Most of this lamp's radiation is in the form of visible light, and at frequencies above 3600 angstrom units. However, approximately 10% of the radiation of this lamp is at frequencies below 3,000 angstrom units and the lamp has a fairly continuous emission spectrum extending to about 2200 angstroms, except in the vicinity of 2550 to 2600 angstroms.

EXAMPLE 2

Hermetically sealed flexible packages were prepared by heat-healing two sheets of laminated film around 3 edge areas, filling with a mixture of a liquid polythiopolymercaptan ("Thiokol LP-3") and a small proportion of a liquid tertiary amine, and then heat-sealing the remaining edge area. The liquid mixture is useful as a component of resin-forming compositions. In one case the laminated film was prepared by extruding 4 mil polyethylene film onto a 1 mil tensilized polyethylene-terephthalate film and then irradiating the interface thus formed with the B-H6 lamp for 15 seconds through the polyethylene. In the other case a commercially available laminate of polyethylene and tensilized polyethylene-terephthalate was employed. Both packages were formed with the polyethylene film on the inside serving as the heat-sealing member, an area about ⅛ inch in width providing a sufficient seal.

The pouches were placed in a desiccator heated to 125° F. at 100% relative humidity. After 5 hours, the pouch prepared from material obtained from regular commercial channels began to show delamination as evidenced bubbles between the polyethylene and the polyester films. After 24 hours, this pouch was completely delaminated whereas the irradiated laminate showed no deterioration. Similar envelopes have successfully contained these and other difficultly-packaged resinous materials for many months at normal room and storage temperatures, where envelopes made with the previously available laminates have invariably failed in such use by delamination.

The following example illustrates the manner in which large scale production of the preferred polyethylene-polyester films of this invention is presently carried out.

EXAMPLE 3

Onto a moving web of oriented polyethylene-terephthalate polyester film is extruded a soft plastic film of polyethylene, the temperature of the polyethylene at the point of extrusion being maintained between about 450° F. and about 550° F. The temperature of this material at the point of its extrusion onto the polyester web, while subject to variation, is of practical importance in that much higher temperatures than the range mentioned tend to degrade the polyethylene and substantially lower temperatures than those mentioned may result in incomplete interfacial contact between the polyester web and the extruded polyethylene film. To assure continuous interfacial contact of the extruded film and the polyester, the polyethylene is extruded onto the polyester web in the nip of a pair of pressure rollers thereby positively pressing the polyethylene and polyester against one another immediately following the extrusion and while the polyethylene is still in a soft plastic state.

After the extrusion coating operation and while maintaining the coated web in a heated state, e.g., in the softening range of the polyethylene and usually between about 225° and 300° F., the coated web is exposed to a short period of high intensity ultra-violet irradiation from an artificial source which firmly bonds the coating and the polyester web to one another at the interface of the coating with the polyester. Since the polyester film absorbs ultra-violet light of wave lengths that pass through atmospheric air, whereas the polyethylene is transmissive of radiations of these wave lengths, it has been found to be preferable that the web be exposed to the ultra-violet irradiation from the polyethylene side.

The ultra-violet irradiation is provided by a bank of 36 watt input, low-pressure, germicidal lamps marketed as G36T6 by General Electric Company, mounted to be within one half to two inches from the coated web. These lamps produce strong emission at a wave length of about 2537 angstroms.

While the coated web can be exposed to the ultra-violet irradiation at lower temperatures than the softening range of the polyethylene, such lower temperatures slow the rate of the bonding reaction. Higher temperatures can also be used; however, they do not accomplish any useful purpose and may melt the film layers.

Using the low pressure lamps indicated, 2.5 mil thick films composed of one half mil thick tensilized polyethylene-terephthalate polyester film overcoated with 2 mil thick layers of polyethylene and held at temperatures in the softening range of the polyethylene have been consistently well bonded by 6 to 8 second exposures of the coated film under the lamps, the interfacial union of the film layers being mechanically stronger than either the polyethylene or the polyester layer; for 1.5 mil thick films each composed of a one half mil tensilized polyethylene-terephthalate polyester films overcoated with a 1 mil polyethylene layer, a 5 to 6 second exposure time has been generally sufficient to create an interfacial union of the same order. In all of these exemplary instances, films were maintained at a temperature in the range of about 225 to 300° F. when subjected to the ultra-violet irradiation.

These times are not mandatory and variations in the exposure times occur with variations in ultra-violet intensity, with different batches of polyethylene and different polyethylene thicknesses, the presence or absence of pigmentation in the polyethylene, as well as with other factors such as variations in the temperature of the film as previously indicated; consequently, it is to be understood that the times given herein are not critical to the practice of the invention.

As a rule of thumb, the thinner the coating polyethylene layer, the shorter the exposure time necessary to firmly adherently bond the coating layer to the polyester layer. However, longer exposure times than necessary to strongly anchor the polyethylene to the polyester are not apparently harmful to the coated film and irradiation exposures of half an hour and longer result in no measurable or apparent film degradation or loss of anchorage of the coating layer to the polyester layer.

A simple "slip sheet" test has been devised to test the strength of the bond between the polyester and the polyethylene. To carry out this test a small sheet, or piece, of polyester is slipped in place on top of the polyester web to be coated with polyethylene. The web, with the slip sheet on a portion thereof, is then coated with polyethylene in the usual manner. The slip sheet covers a small portion of the web and on this portion the slip sheet is of course coated with the polyethylene leaving the web area underneath bare of such coating.

After the polyethylene layer is firmly anchored by irradiation to the polyester, a section of the thus formed polyethylene-polyester film about twice as wide as the slip sheet and containing the slip sheet is cut from the main body of the film and folded over so that the polyethylene abuts itself.

A one inch wide section of the folded over film including about a one-half inch wide portion of the slip sheet is then heat-sealed between a pair of heat-sealing jaws, heated to 375° F. and held at a pressure of about 60 pounds per square inch for about two seconds. After heat-sealing, one inch wide test strips about two inches long are cut out of the heat-sealed section in a direction perpendicular to the length of the heat-seal in such a manner that one end portion of the test strip is the heat-sealed portion, composed of top and bottom polyester layers and intermediate polyethylene layers heat-sealed to one another, and the other end portion is in the form of two tabs. The first tab is composed of the top polyester layer, the heat-sealed intermediate polyethylene layers and the underlying slip sheet. The second tab is composed of the portion of the bottom polyester layer which was underneath the slip sheet. With this arrangement, any attempt to pull the tabs apart is essentially an attempt to disrupt the polyester to polyethylene bond.

Tensile tests on test strips of polyester-polyethylene films of one-half mil thick polyester overcoated with from 1 to 4 mil thick polyethylene layers irradiated in accordance with the procedure of this example for commercially practical periods of from about 6 seconds for the 1 mil polyethylene overcoating to about 13 seconds for the 4 mil thick polyethylene coatings have shown that the interfacial bond between the polyester and polyethylene layers is not only as strong as the internal strength of the polyethylene, but is in fact at least as strong as the much stronger tensilized one-half mil polyester film. When the tabs of such test strips were clamped in the opposing jaws of a Suter tensile testing device (similar to the Instron tester noted elsewhere herein) and the jaws moved away from one another, failure of the test strip invariably occurred by breaking of the single layer polyester tab when a force of between about 9 to 11 pounds was reached in moving the jaws away from one another. No delamination of the polyethylene from the polyester occurred.

These films may be easily heat-sealed using conventional unmodified cellophane packaging machinery or even by pressing with a hand iron in the formation of simple fin type seals. In machine heat-seal bonding the polyethylene layers of adjacent film portions are bonded to one another by pressing the adjacent film portion between bare heat-seal jaws at temperatures of from about 275 to about 400° F.; excellent results having been obtained within this range of heat-sealing temperatures at jaw pressures of from 20 to 60 pounds per square inch with a dwell time of the portion to be heat-sealed between the jaws of from one half to two seconds. Films of one half mil thick polyester overcoated with 1 to 4 mil thick layers of polyethylene and heat-sealed at 375° F. at a jaw pressure of about 60 pounds and a dwell time of about two seconds have, in our experience, usually displayed a heat-seal strength, when tabs extending beyond the heat-sealed seam were clamped between the opposing jaws of the tensile tester, of from about ten to about seventeen pounds per inch of seal width before rupturing the heat-seal bond, the rupturing force increasing as the polyethylene thickness increases. Further, the rupture always occurred either through splitting within the polyethylene or through film breakage.

Lightweight, 10W motor oil packaged in heat-sealed packages of two and one half mil thick film prepared in accordance with this example (½ mil "Mylar" and 2 mil polyethylene), stored for a period of 180 days at temperatures on the order of 120° F. at 95% relative humidity showed a weight change of less than 4/10 of 1% and no evidence of delamination between the polyethylene and the polyester layers, although it is known that this oil permeates polyethylene films in much thicker layers than 2 mil.

Hydraulic fluid packaged in heat-sealed packages of the same film under the same conditions and for the same period of time showed a weight change in this period of time of less than 5/10 of 1%.

The thin, high strength, heat-sealable films made in accordance with this example display excellent low-temperature flexibility and are particularly useful for replacing rigid containers in the packaging of pickles, sauerkraut, relishes, vegetable oils and vegetable oil containing foods. Foods packaged in heat-sealed packages of these films may be subjected, after packaging, to pasteurization temperatures as high as 235° F. for periods as long as half an hour. Packages of these films have also withstood beta and gamma irradiation dosages such as those utilized for sterilizing foodstuffs without visible degradation or delamination of the films. These films retain their flexibility at temperatures as low as −70° F. and as high as 240° F. and are unaffected by rapid temperature changes such as occur by removing a package from a freezer compartment and immersing it in boiling water. These features impart a uniquely broad field of packaging utility to these polyester-polyethylene films, which provide a heretofore unobtainable combination of desirable properties in the film packaging field.

Where it is desired to coat both sides of the polyester layer with polyethylene, after running through the cycle described previously in this example, the film is then turned over on its back so that the remaining polyester surface is exposed and the cycle repeated. These double coated films have the advantage that both surfaces of the film are heat-sealable enabling the formation of lap seals i.e., seals where one edge is lapped over another.

In many instances, as for example, when the polyester-polyethylene film is to be used as a transparent covering for maps, documents, or in "skin-packaging" applications, i.e., the film stretching skin tight over the packaged article, it is desirable that the polyester film be in its natural, unoriented or untensilized state to take advantage of the greater stretch of the film in this state, and such films can be made following the procedure of any of the preceding examples.

While polymeric polyester films of ethylene glycol and terephthalic acid, were used in the film structures of the preceding examples, other thin, strong, tough, heat-resistant polyester polymers having polyester linkages in the polymer backbone chain, and particularly those of polybasic aromatic acids and polybasic aliphatic (including cyclo-aliphatic) alcohols, may be substituted in this preferred film construction. One such polyester is poly 1, 4-bis (methylene) cyclohexane terephthalate, a polymer of terephthalic acid and 1,4-bis (hydroxymethylene) cyclohexane, marketed by Tennessee Eastman Company.

These multi-layer films are unique in the strength and chemical resistance of the union between the layers thereof, enabling the combining of film layers of widely divergent chemical and physical properties with one another in the production of packaging films having heretofore unobtainable packaging properties, and adapting them to the packaging of a wide array of difficultly packageable materials such as tobacco, foodstuffs, lubricants, chemicals, creams, soaps, caulking compounds, detergents, hardware and the like.

Numerous other multi-layer films have been made, composed of a difficultly heat-sealable organic polymer film layer and a readily heat-sealable organic polymer film layer united therewith, following the irradiation procedures of the foregoing examples as will be apparent from the examples hereinafter.

EXAMPLE 4

In one series of film preparations five inch square film substrates of various polymeric materials were prepared. Each film substrate was warmed on a hot plate at 110° C. for one minute, the film having been flattened into place on the hot plate by means of a hard rubber hand roller. While still on the hot plate, a 4 mil polyethylene film 4½ inches square was then placed on the film substrate and the two pressed together by means of the hard rubber hand roller. The laminate thus formed was then removed from the hot plate and a portion of the polyethylene stripped back from one edge of the interface sufficiently far to permit the insertion of a narrow parting strip of polytetrafluoroethylene. The laminate was then reheated on the hot plate with the strip insertion in place and rolled flat at 110° C. on the hot plate for an additional five minutes.

Two laminates of each film substrate were so prepared and one laminate of each pair was then exposed to ultraviolet irradiation from the B–H6 lamp for a period of ten to 20 minutes, depending on the substrate film, during which time the films were cooled by a minimum flow of air just sufficient to prevent burning. The film structure so formed was then cooled to room temperature, the polytetrafluoroethylene insert removed and the laminate cut into one half inch wide strips, the cuts being made perpendicular to the free edge of the laminate.

The bond strength between the two layers of the film structure was then tested qualitatively by manual pulling and subsequently quantitatively by means of a mechanical peel test on an Instron testing machine. The non-irradiated control sample formed by following a procedure identical to the sample to be tested with the exception that the irradiation step was not included was also tested on the Instron testing machine along with each irradiated sample.

The Instron testing machine is a conventional tensile testing device comprising a pair of upper and lower jaws vertically spaced from one another. The upper jaw is held fixed and the lower jaw can be moved away from the upper jaw at a controlled rate of speed, the force being required to maintain the controlled rate of speed being registered in ounces. In the test that follows the rate of speed at which the lower jaw moved away from the upper jaw was 2 inches per minute and the quantitative values are therefore registered in ounces per half inch width of the strips required to either delaminate the layers or break the weaker of the film layers.

To carry out the testing on the Inston testing machine, the exposed surface of the substrate film was adhesively bonded to a metal plate with the unbonded end tab of the film sample left free. Adhesive tape was then applied to the unbonded polyethylene end tab to form a tape tab serving as a handle, the tape tab then being clamped in the upper jaw of the Instron testing machine, the tab being doubled back across the metal plate at an angle of 180°. The rest of the structure, namely the metallic plate, was then attached in a vertical position to the lower jaw of the Instron testing machine and the lower jaw pulled away from the upper jaw.

In all cases wherein the step of irradiating the interface of the film was included, the polyethylene broke, the average of the highest recorded forces registered before break for the films being about 45 ounces per half inch width of film. In all the control samples wherein the irradiation step was not included, the polyethylene invariably separated quickly and readily from the substrate film at an average force of about ½ ounce per ½ inch of film width.

The table below sets forth the list of substrate films used in this example along with their melting points and the exposure time to the B–H6 lamp of each of these films coated with polyethylene.

*Table I*

| Substrate film | M.P.,°C. | Exposure time to U.V. of coated film, minutes |
|---|---|---|
| 1,4-bis(methylene) cyclohexane terephthalate | 270 | 10 |
| Polycarbonate film of— $\left[-O-\underset{}{\bigcirc}-\underset{CH_3}{\overset{CH_3}{\underset{|}{C}}}-\underset{}{\bigcirc}-O-\overset{O}{\underset{\|}{C}}-\right]_n$ | 240 | 10 |
| Hexamethylene adipamide (Nylon 6,6) | 263 | 20 |
| Polycaprolactam (Nylon 6) | 240 | 20 |
| Hexamethylene sebacamide (Nylon 6,10) | 209 | 20 |
| "Penton" film of Hercules Powder Co., which is polymer of— $\left[-O-CH_2-\underset{CH_2Cl}{\overset{CH_2Cl}{\underset{|}{C}}}-CH_2-\right]_n$ | [1] 232 | 10 |
| "Durethan U$_{20}$" a polymer of toluene diisocyanate reacted with an adipic acid—ethylene glycol prepolymer, a product of Farbenfabriken Bayer, Leverkusen, Germany | | [2] 11 |
| Polyvinyl fluoride | | [2] 13 |
| Polyvinyl chloride | | [2] 10 |

[1] Molding temperature.
[2] Exposed to 15 watt, low pressure GE–G8T5 lamp.

*Example 5*

Films of low melting (about 150° F.) rubber hydrochloride, marketed as "Pliofilm" by Goodyear Tire and Rubber Co., were laminated to films of polyethylene terephthalate polyester, hexamethylene sebacamide, and hexaxylylene sebacamide, all of which have melting points above 400° F., by laying each of the latter films on a hot plate heated to about 120° C. and laminating the rubber hydrochloride film thereto by rolling with a hand roller, then immediately thereafter subjecting the laminate, through the "Pliofilm" side to irradiation by two 30 watt, low pressure germicidal lamps having strong emission at 2537 angstroms at a lamp-to-film distance of about 2 inches for varying periods of time. Thus, the "Pliofilm" to polyethylene terephthalate laminate was irradiated for five minutes; the "Pliofilm" to hexamethylene sebacamide laminate for 20 minutes and the "Pliofilm" to hexaxylylene sebacamide for four minutes.

Attempts to disrupt the interfacial bonds of the laminated films by pulling end tabs of the films apart on an Instron tensile testing machine in all instances resulted in braking of the "Pliofilm" at a force of about fifty ounces per one half inch of strip width, with no evidence of delamination.

The resultant laminates were easily heat-sealed with a hot flat iron held at about 250° F. and hand pressed against the folded-over portion of the laminate for about four seconds.

Strong heat-seals were formed in all cases, and the force required to disrupt the heat-seal bonds by pulling end tabs away from one another was in excess of forty ounces per one half inch of heat-seal width.

*Example 6*

Oriented polyethylene terephthalate polyester film, 1 mil in thickness, was coated with a vinyl chloride/vinyl acetate/maleic anhydride terpolymer (86:13:1) and dried for ten minutes at 65° C. to a coating weight of 0.5 grain per 24 square inches. The interface was irradiated through the primer layer for five exposures of 12 seconds each with the B–H6 lamp.

Two portions of the polyester film were laminated together by bringing their coated surfaces into contact for five seconds at 120° C. under the pressure of several passes of a small hand roller. The resulting laminate could not be separated without tearing the film whereas a laminate prepared without irradiation but otherwise following the identical procedure could be easily separated, the delamination occurring at one of the bonds between the vinyl polymer and the polyester film.

One-inch wide laminates prepared with and without irradiation were tested on an Instron Tensile Tester. The laminate was initially peeled apart at one end, and each layer of polyester film was connected to one jaw of the Tester. The jaws were moved directly apart at a speed of two inches per minute. Attempts to delaminate the film by this test failed and resulted in tearing of the film.

Pieces of the coated and irradiated polyester film were heat-sealed to provide packages of excellent strength and clarity for various articles such as items of hardware. A package of steel nuts and bolts was subjected to extremely rough handling without showing any evidence of wear.

Although high melting, high strength polyester films provide the preferred difficultly heat-sealable portion of the films of this invention, having an unusually desirable combination of properties useful in the film packaging art, as is illustrated by the examples polyamides and polyethers, as well as other tough, high melting polymers self sustaining in thin film form may also provide useful, but difficultly heat-sealable film layers, to which may be firmly adherently bonded lower melting, readily heat-sealable layers in the practice of this invention.

Likewise, as is illustrated by Examples 5 and 6, while polyethylene is the preferred heat-sealable layer, other low melting film forming polymer layers, heat-sealable at moderately elevated temperatures, preferably below 400° F., may be filmly anchored to higher melting difficultly heat-sealable layers by ultra-violet irradiation of the interface.

By polyethylene we contemplate poly-aliphatic hydrocarbons, e.g., polyethylene as such, as well as equivalent homologues, e.g., polypropylene, copolymers of ethylene and propylene in varying proportions, etc.

To create a firmly adherent layer to layer bond, by the use of the ultra-violet irradiation herein described, one of the film layers must be relatively absorptive of ultra-violet light that normally passes through air and particularly within the range generally emanating from artificial sources such as the lamps used in the working examples preceding, e.g., between about 1850 A and about 3600 A, as compared to the other film layer. Where one film layer is highly absorptive of and the other film layer is comparatively transmissive to ultra-violet emanations of such wave lengths, the exposure time to the artificial ultra-violet light source to achieve firmly adherent layer to layer bonding is extremely short, as in the case of "Mylar"-polyethylene laminates. When the ultra-violet absorptivity difference between the films is less marked, the bonding time under the same irradiation source and conditions is considerably lengthened, as in the case of hexamethylene adipamide-polyethylene and some of the other laminates disclosed herein.

In many instances it is desirable to provide a film composed of film layers having similar ultra-violet absorption characteristics relative to ultra-violet light of wave lengths that pass through air. It has been found possible to coat the surface of one layer with a sensitizing coating, apparently making the coated layer sufficiently more opaque to ultra-violet light than the other layer to enable the creation in reasonably short time of a firm interfacial bond between the layers upon ultra-violet irradiation of the layer to layer interface from the side of the uncoated layer from a suitable lamp source. The following example illustrates this technique.

EXAMPLE 7

A polyvinyl alcohol film sample, placed on a smooth, aluminum foil sheet on a smooth surfaced hot plate held at 170° C., had spread thereover a thin film of benzoyl chloride. The benzoyl chloride was then allowed to evaporate from the film for a period of about 5 minutes while the film remained on the hot plate. Then, the coated film was removed from the hot plate and thoroughly washed with acetone and returned to the hot plate with the coated side exposed. When the film temperature reached the temperature of the hot plate surface, about 170° C., a layer of polyethylene was laminated thereto by hand rolling with a hand roller. The film was then cooled to about 140° C. and subjected to the irradiation of two 15 watt low pressure germicidal lamps having strong ultra-violet emission at about 2537 angstroms mounted in a bank spaced about 1 inch from the film for a period of 13 minutes.

A similar film sample was prepared of polyvinyl alcohol and polyethylene except that the benzoyl chloride coating step was omitted. This laminated film construction was subjected to irradiation from the bank of lamps noted above for a period of 60 minutes.

When tested as in Example 5, the benzoyl chloride coated film sample displayed no evidence of delamination or interfacial rupture, the polyethylene tearing upon attempted delamination, the highest force registered prior to tearing of the polyethylene being about 42 ounces per ½ inch of width. The sample with no benzoyl chloride coating which had been irradiated for a total of 60 minutes failed to produce any significant layer to layer bond strength and was easily delaminated, the delamination force being no higher than 7 ounces per ½ inch of width.

Similarly, a cellulose acetate film was treated with benzoyl chloride and laminated with polyethylene. The resulting laminate was irradiated at 110° C for about 10 minutes under the two 15 watt germicidal lamps previously mentioned in this example. The resultant film had a layer to layer bond strength stronger than that of the polyethylene, as evidenced by the tearing of the polyethylene film upon attempts to delaminate the layers. Here again, a similar film of cellulose acetate-polyethylene prepared as hereinbefore noted, except that the benzoyl chloride coating step was eliminated, failed to produce any layer to layer bond strength of significance and the layers readily mechanically delaminated at a force of less than an ounce.

A sample piece of cellophane film applied to a hot plate surface in the same manner as the polyvinyl alcohol film was coated with a saturated (at about 25° C.) solution of benzoyl cellulose in acetone, which was then allowed to evaporate while the film remained on the hot plate at about 160° C. for 5 minutes. A film of polyethylene was then hand rolled onto the coated cellophane, the film cooled to about 126° C. and subjected to the 15 watt low pressure lamp bank noted previously in this example for about 10 minutes. Attempts to delaminate the polyethylene from the cellophane in the manner of Example 5 resulted in tearing of the polyethylene with no evidence of delamination.

A similar cellophane film sample prepared as above, with the exception that no coating of benzyl cellulose was applied to the cellophane, produced no significant layer to layer bond strength between the cellophane and the polyethylene.

In all the cases of this example both the substrate films and the heat-sealable polyethylene coatings are normally quite transmissive of ultra-violet light of wave lengths that normally pass through atmospheric air.

With certain substrate films to which it is desired to bond polyethylene or a similar heat-sealable layer, other pretreatment procedures than that of Example 7 have been found effective. One of these other procedures is described in the example following.

EXAMPLE 8

Five inch square thin substrate films were prepared of "Kel-F," chlorotrifluoroethylene polymer, a product of Minnesota Mining and Manufacturing Company, "Delrin," formaldehyde polymer having the recurring structure $-O-CH_2-$, a product of E. I. du Pont de Nemours & Co., and the polycarbonate film of Table I.

Each of these substrate films was rolled into a tubular shape and inserted in a glass tube. The tube was then sealed at its ends by means of electrodes and air evacuated therefrom to provide a vacuum within the tube of between about 0.5 and 0.6 millimeters of mercury. Thereafter an electric current was passed between the electrodes and a visible blue glow induced within the tube, this apparatus and the manner of inducing the glow being more fully described with reference to FIGURE 1 of the co-epnding application Serial No. 661,784, of our colleague, Gordon R. Smith, filed May 27, 1957, now abandoned.

Each of the substrate films was exposed to the glow discharge in the apparatus described for a period of five minutes and then removed from the apparatus.

Thereafter, a polyethylene layer about 4 mils thick, was applied to the exposed surface of each substrate film by hand roller pressing the polyethylene thereon on a hot plate and the resulting film subjected to interfacial irradiation through the polyethylene layer as described in Example 4. The "Kel-F"-polyethylene film was subjected to exposure from the B–H6 lamp for five minutes; the "Delrin"-polyethylene film was subjected to exposure from the B–H6 lamp for 10 minutes; and, the polycarbonate-polyethylene film was subjected to exposure from the B–H6 lamp for 4 minutes.

The resulting laminates, when subjected to the mechanical peel test, described with reference to the Instron testing machine in Example 4, failed to delaminate and in all instances the polyethylene broke upon attempting to peel the layers apart.

Control film laminates of polyethylene and the substrate films of this example were also made following the procedure of this example, except that none of the substrate films was subjected to any glow discharge treatment prior to the application of the polyethylene layer thereto.

In the case of the control films of "Delrin"-polyethylene and "Kel-F"-polyethylene, no significant bond strength developed between the film layers even upon subjecting the layer to layer interfaces to ultra-violet irradiation from the B–H6 lamp for periods as long as half an hour and the layers were readily delaminated by simple hand peeling. In the case of the polycarbonate-polyethylene control sample, the ultra-violet irradiation time at which a strong bond was observed was about 10 minutes, as given in Table I of Example 4, more than twice the time observed with the film laminate containing the flow discharge treated substrate noted above.

While hereinabove we have illustrated the making of our novel films by a number of examples, and have illustrated a preferred step in combining those films involving the use of ultra-violet irradiation, it will be understood that our films are novel irrespective of their method of production, and quite apart from whether primers, or other media or techniques, are used to give the desired high bond strength between film layers, in combination with the use of ultra-violet light, or in the absence of the use of ultra-violet irradiation.

Hereinabove we have described our invention by various examples and embodiments, which are meant to illustrate our invention and not to limit it.

What is claimed is:

1. A composite laminated transparent film having a total composite thickness in the range of about 1 to 10 mils and comprising preformed polymer layers and being heat-sealable at moderately elevated temperatures below about 400° F., said film consisting essentially of a thin, tough, difficultly heat-sealable organic polymer as a film layer, and a preformed readily heat-sealable organic polymer as a film layer surfacing at least one side thereof and being self-unified therewith and chemically interfacially bonded thereto, the interfacial union of the layers with one another being so strong that the layers cannot be mechanically separated.

2. A composite laminated transparent packaging film having a total composite thickness in the range of about 1 to 10 mils and comprising preformed polymer layers and being heat-sealable at moderately elevated temperatures below about 400° F., said film consisting essentially of a thin, tough difficulty heat-sealable organic polymer film layer, and a preformed readily heat-sealable organic polymer as a film layer surfacing at least one side thereof and being self-unified therewith and chemically interfacially united therewith, the interfacial union of the layers with one another being so strong that the layers cannot be mechanically separated, and remaining intact upon prolonged vapor penetration thereinto through one of the layers of said film, one of said layers being transmissive to ultra-violet emission which pass through the ambient atmosphere and the other of said layers being absorptive to such ultra-violet emission.

3. A composite laminated packaging film having a total composite thickness of about 1 to 10 mils and comprising preformed polymer layers and being heat-sealable at moderately elevated temperatures of about 275° to 400° F., said film consisting essentially of a difficultly heat-sealable organic polymer film layer and a readily heat-sealable polyethylene as a film layer surfacing at least one side thereof and self-unified therewith and chemically interfacially united therewith, the interfacial union of the layers to one another being so strong that attempts to peel them apart mechanically result in tearing of said polyethylene film layer, and said packaging film remaining intact upon prolonged exposure to vapor penetration into the interfacial area through one of said layers.

4. As a new article of manufacture, a plural layer film having a total composite thickness of about 1 to 10 mils and consisting essentially of a preformed polyester polymer as a film layer and a preformed polyethylene as a film layer surfacing at least one side of said polyester film layer and self-unified therewith and chemically interfacially bonded thereto, the union of the layers to one another being so strong that attempts to peel them apart mechanically result in tearing said polyethylene layer, said plural layer film being heat-sealable at moderately elevated temperatures of below about 400° F.

5. As a new article of manufacture, a composite laminated transparent film having a total composite thickness of about 1 to 5 mils and comprising preformed polymer layers consisting essentially of a high melting polyester as a film layer and a preformed polyethylene as a film layer surfacing at least one side thereof and self-unified therewith and chemically interfacially bonded thereto, the union of the layers to one another being so strong that the layers cannot be mechanically separated, and the union of said layers remaining intact upon prolonged vapor permeation thereinto, said film being heat-sealable at moderately elevated temperatures of below about 400° F.

6. As a new article of manufacture, a composite laminated transparent packaging film having a total composite thickness of about 1 to 5 mils and comprising preformed polymer layers consisting essentially of an oriented high melting polyester film layer and a preformed polyethylene as a film layer surfacing at least one side thereof and self-unified therewith and chemically interfacially bonded thereto, the union of the layers to one another being so strong that an attempt mechanically to separate the layers results in rupture of the polyethylene layer, and remaining intact upon prolonged vapor permeation thereinto, said film being heat-sealable at moderately elevated temperatures of about 275° to 400° F.

7. As a new article of manufacture, a composite laminated transparent film comprising preformed polymer layers consisting essentially of a high melting polyester film layer of a polybasic aromatic acid and a polyhydric aliphatic alcohol, and a preformed polyethylene as a layer, the layers being chemically interfacially united with one another and forming an interfacial union so strong that an attempt mechanically to separate the layers results in rupture of the polyethylene layer, said film being heat-sealable within a moderately elevated temperature range of about 275° to 400° F., said interfacial union remaining intact upon penetration of vegetable oils thereinto.

8. A composite laminated packaging film, heat-sealable within a moderately elevated temperature range of about 275° to 400° F. comprising preformed polymer layers and having a total composite thickness of about 1 to 10 mils, consisting essentially of a high melting, difficultly heat-sealable polyester film layer and a low melting readily heat-sealable preformed organic polymer as a film layer self-unified therewith and chemically interfacially bonded thereto, the strength of the bond between said polyester layer and said organic polymer layer being so strong that the layers cannot be mechanically separated, said polyester film layer melting at temperatures above said aforesaid range required to heat-seal said packaging film, and the film layers remaining continuously bonded to one another upon prolonged permeation of vapors through one of said layers into the interfacial area therebetween wherein said layers are bonded to one another.

9. As a new article of manufacture, a composite laminated film, heat-sealable within a moderately elevated temperature range of about 275° to 400° F., and having a thickness of about 1 to 10 mils, comprising preformed polymer layers consisting essentially of a polyethylene-terephthalate film layer and a preformed polyethylene as a layer self-unified therewith and chemically interfacially bonded thereto, the bond between said polyester and said polyethylene being so strong that an attempt mechanically to separate the layers results in rupture of the polyethylene layer.

10. A new article of manufacture, a composite laminated transparent packaging film, heat-sealable within a moderately elevated temperature range of about 275° to 400° F. and having a total composite thickness of about 1 to 5 mils, comprising preformed polymer layers consisting essentially of an oriented polyethylene-terephthalate film layer and a preformed polyethylene as a layer self-unified therewith and chemically interfacially bonded thereto, the strength of the bond between said polyester layer and said polyethylene layer being so strong that an attempt mechanically to separate the layers results in rupture of the polyethylene layer.

11. A composite laminated packaging film, heat-sealable within a moderately elevated temperature range of below about 400° F. and having a total composite thickness of about 1 to 10 mils, comprising preformed polymer layers consisting essentially of a high melting, difficultly heat-sealable oriented polyester film layer of a polybasic aromatic acid and a polyhydric aliphatic alcohol, and a preformed low melting readily heat-sealable organic polymer as a film layer self-unified therewith and chemically interfacially bonded thereto, the strength of the bond between said polyester layer and said organic polymer layer being so strong that the layers cannot be mechanically separated.

References Cited by the Examiner

UNITED STATES PATENTS

| | | | |
|---|---|---|---|
| 2,668,133 | 2/54 | Brophy et al. | 154—126 |
| 2,715,075 | 8/55 | Wolinski | 117—47 |
| 2,815,308 | 12/57 | Robinson et al. | 154—46 |
| 2,824,026 | 2/58 | Homeyer et al. | 117—122 |
| 2,845,541 | 7/58 | Berry et al. | 250—52 |
| 2,875,092 | 2/59 | Cline. | |
| 2,876,067 | 3/59 | Nagel et al. | 117—138.8 |
| 2,907,675 | 10/59 | Gaylord | 117—47 |
| 2,919,059 | 12/59 | Sporka | 229—3.5 |
| 2,999,772 | 9/61 | Burk et al. | 117—138.8 |

OTHER REFERENCES

"Effects of Atomic Radiation on High Polymers," by K. H. Sun, Published in Modern Plastics, September 1954, pp. 141–144, 146, 148, 150, 229–233, 236–238.

EARL M. BERGERT, *Primary Examiner.*

CARL F. KRAFFT, JAMES S. BAILEY, *Examiners.*